United States Patent [19]

Tsuzuki et al.

[11] Patent Number: 5,245,888
[45] Date of Patent: Sep. 21, 1993

[54] CAMSHAFT FOR INTERNAL COMBUSTION ENGINES

[75] Inventors: Atsuyuki Tsuzuki; Yasuhiro Mishima, both of Toyota; Kunihiro Takenaka, Chigasaki; Tokio Yamamuro, Chigasaki; Hidehiro Hayasaki, Chigasaki, all of Japan

[73] Assignee: Toyota Jidosha Kabushiki Kaisha, Toyota, Japan

[21] Appl. No.: 851,621

[22] Filed: Mar. 16, 1992

[30] Foreign Application Priority Data

Mar. 18, 1991 [JP] Japan .................. 3-078486

[51] Int. Cl.$^5$ .................. F16H 53/00; F01L 1/04
[52] U.S. Cl. .................. 74/567; 123/90.6; 123/90.17; 403/359; 29/888.1
[58] Field of Search .................. 74/567, 568 R; 123/90.6, 90.17; 403/359; 29/888.1

[56] References Cited

U.S. PATENT DOCUMENTS

| 4,882,825 | 11/1989 | Nakamura | 74/567 |
| 4,977,793 | 12/1990 | Husted | 403/359 X |
| 5,136,887 | 8/1992 | Elrod et al. | 123/90.6 X |

FOREIGN PATENT DOCUMENTS

| 2752405 | 5/1979 | Fed. Rep. of Germany | 74/567 |
| 3705114 | 9/1988 | Fed. Rep. of Germany | 74/567 |
| 61-94209 | 6/1986 | Japan | 74/567 |
| 61-94210 | 6/1986 | Japan | 74/567 |
| 62-233562 | 10/1987 | Japan | 74/567 |
| 4-34258 | 2/1992 | Japan | 74/567 |
| 1587295 | 8/1990 | U.S.S.R. | |

OTHER PUBLICATIONS

SAE Technical Paper 900634 of Ted B. Randall et al. entitled "The Composite Camshaft: Advanced Materials to Meet the Requirements of Today".

Primary Examiner—Vinh T. Luong
Attorney, Agent, or Firm—Kenyon & Kenyon

[57] ABSTRACT

A camshaft for internal combustion engines, the camshaft having a double-pipe shaft portion comprising an outer pipe, an inner pipe, and an intermediate layer therebetween. The intermediate layer is composed of a layer of a thermoplastic liquid crystalline polyester resin that has been injected into a gap between the outer pipe and the inner pipe, by an injection molding machine. The camshaft is lightweight and has excellent vibration-damping properties, and further, has a structure allowing an easy manufacture thereof, and thus is suitable for mass production.

6 Claims, 1 Drawing Sheet

CAMSHAFT FOR INTERNAL COMBUSTION ENGINES

BACKGROUND OF THE INVENTION

1. Field of the Invention

This invention relates to a camshaft for internal combustion engines. More particularly this invention relates to a camshaft having a lightweight and excellent vibration-damping properties, and having a structure such that the camshaft is easily fabricated, and thus is suitable for a mass production thereof.

2. Description of the Related Art

In the manufacture of automobiles a serious problem is a reduction of the weights of the various parts and a suppression of noise produced when driving.

In this regard, Japanese Unexamined Utility Model Publication (Kokai) No. 61-94210 discloses a camshaft having a shaft portion formed as a pipe formed by laminating two steel plate with a viscoelastic high molecular weight resin therebetween i.e. the camshaft is made of a composite vibration-damping steel plate.

Nevertheless, the camshaft disclosed in Japanese Unexamined Utility Model Publication (Kokai) No. 61-94210 is formed by bending a composite vibration-damping steel plate to form a pipe having a seam closed by a welding process, and as a result, has following defects.

The high temperature necessary for the welding decomposes the high molecular weight resin at the seam portion and accumulates decomposed gas, and thus the expected vibration-damping properties are not exhibited.

As a measure for solving the above problem, there may be thought of a method of injecting a reactive liquid, such as polyamide oligomer (monomer), into the space between the outer pipe and inner pipe forming the double pipe structure, and carrying out a high degree polymerization, or making three-dimensional polymer by using a catalyst or heat.

Such a method, however, needs long reaction time, and as it is difficult to make the reaction rates uniform, this method is not suitable for mass production. Moreover the method has a problem of a leakage of unreacted products, which corrode the metal portions Furthermore, the anion polymerization used for the above reaction requires a moisture control, etc., and thus many problems arise in an industrial production of such a shaft.

SUMMARY OF THE INVENTION

In view of the above, an object of this invention is to provide a camshaft for internal combustion engines, the camshaft having a light weight and excellent vibration-damping properties, and further, having a structure such that the making of the shaft is facilitated, and thus it is suitable for a mass production thereof.

As a result of a thorough investigation into the structural limitations of camshafts for internal combustion engines, and the characteristics of various high molecular weight resins, to attain the above object, the present inventors accomplished this invention by confirming that a camshaft utilizing a specific resin, by using a specific method, can fully attain the above object.

This invention relates to a camshaft having a double-pipe shaft portion comprising an outer pipe, an inner pipe and an intermediate layer, wherein said intermediate layer is composed of a thermoplastic liquid crystalline polyester resin layer injected into a space between the outer and inner pipes, by an injection molding machine.

DESCRIPTION OF THE PREFERRED EMBODIMENTS

Figure 1:
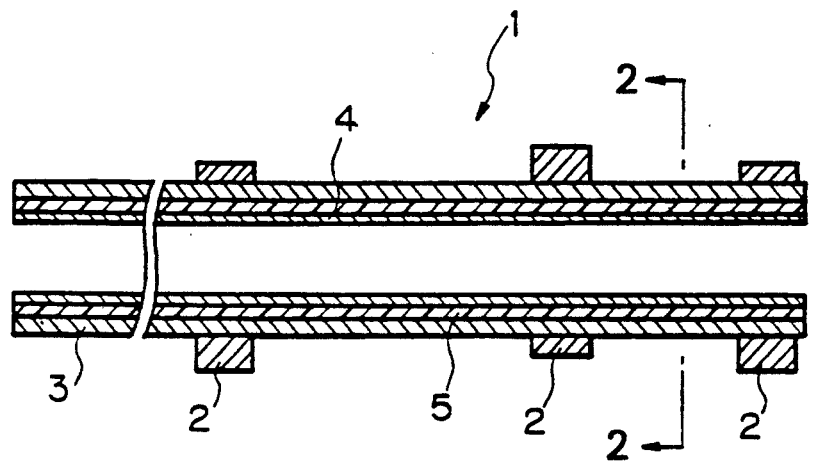
FIG. 1 is a side cross-sectional view of an embodiment of the camshaft for internal combustion engines of this invention.

This invention will be now explained in detail.

The fundamental structure of the camshaft for internal combustion engines according to this invention is the same as that described in Japanese Unexamined Utility Model Publication (Kokai) No. 61-94210, and is composed of a hollow shaft portion 1 and a plurality of cam pieces 2 disposed along and fixed to the outer periphery thereof, and separated from each other in the direction of the axis thereof.

The shaft portion 1 has a double pipe structure composed of an outer pipe 3 and an inner pipe 4; the outer pipe 3 is preferably made of steel, and the inner pipe 4 is preferably made of aluminum.

The camshaft for internal combustion engines according to this invention is characterized in that the thermoplastic liquid crystalline polyester resin is selected as a high molecular weight resin, and that the intermediate layer 5 of the thermoplastic liquid crystalline polyester resin is formed by injecting same into the space or gap 6 between the outer pipe 3 and the inner pipe 4, by an injection machine.

The camshaft for internal combustion engine having the above double-pipe structure preferably has a gap between the outer pipe 3 and the inner pipe 4 of 1 to 4 mm. When the gap is less than 1 mm, the vibration-damping effect is not properly exhibited, and further it is difficult to form such a thin and long resin layer in the space of an ordinary length camshaft by an injection molding technique. When the interval is more than 4 mm, however, the vibration-damping effect is not particularly increased, the rigidity of the camshaft as a whole is lowered, and the cost of manufacturing the camshaft is increased. Therefore, preferably the length of the camshaft giving a vibration-damping property due to the resin layer is 250 mm or more.

The injection mold process is per se well known in the art of high-molecular polymer, but the class of high-molecular resins that can be uniformly injection-molded in a relatively long and extremely narrow space formed by the above double-pipe structure, is limited.

Further, as the vibration damping-effect based on a high molecular resin layer is attributed to the periodic damping action due to the visco-elastic hysteresis caused by a shear deformation or elongation deformation thereof, the above high-molecular resin must be a visco-elastic high-molecular resin.

This invention is based on the finding that the thermoplastic liquid crystalline polyester resin can be used as a viscoelastic high molecular resin injectable by an injection molding machine under the above structural limitation of the camshaft for internal combusion engines, and the essence of this invention resides in this finding.

The thermoplastic liquid crystalline polyester resin used in this invention is a polyester resin exhibiting an optical anisotropy in the melted state, and more concretely, is one optionally selected from a group of polyesters having at least one segment represented by the following general formula.

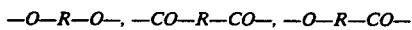

wherein R is a divalent group optionally selected from the groups represented by the following chemical formulae:

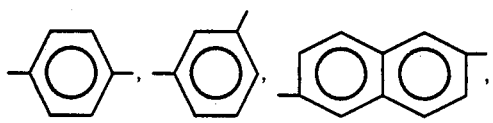

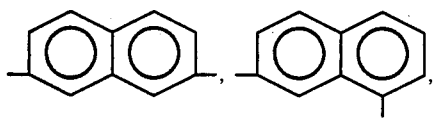

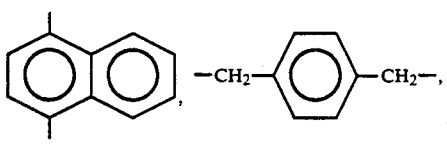

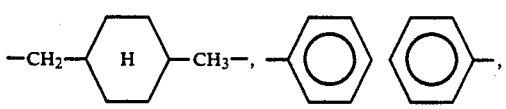

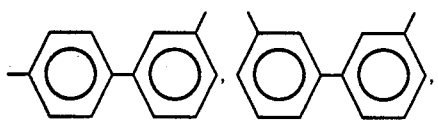

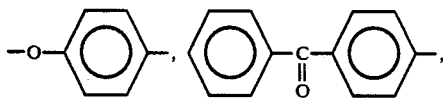

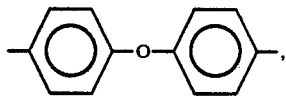

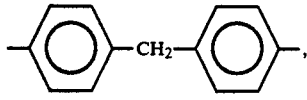

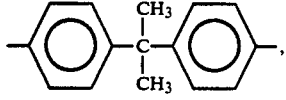

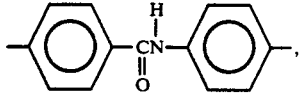

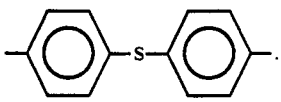

The aromatic and alicyclic group in the above formulae may be replaced by a substituent selected from the groups represented by the following chemical formulae:

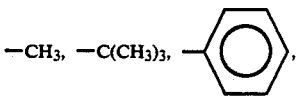

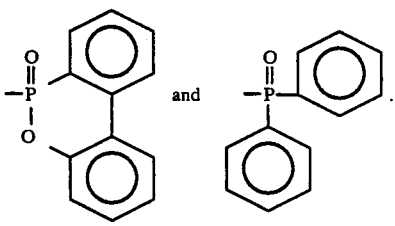

The preferred thermoplastic liquid crystalline polyester resin has a repeating unit represented by any of the following chemical formulae (a), (b), (c) and (d):

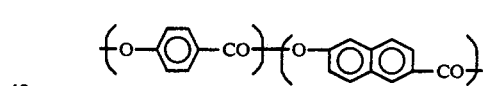
(a)

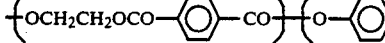
(b)

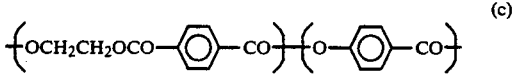
(c)

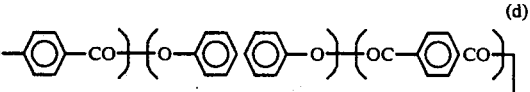
(d)

Further the thermoplastic liquid crystalline resin may be used as a composition comprising glass fibers, thermoplastic elastomers, plasticizers, and fillers, etc., for improving the vibration-damping property, etc. as long as it does not hinder the attaining of the intended object of this invention.

Although the injection molding in this invention uses a relatively small amount of resin, a relatively large molding machine must be used due to the high injection pressure, and thus the residence time of the resin in the cylinder of the molding machine is relatively long.

Therefore, to effectively prevent problems such as resin decomposition, gelation, short shot, etc., during the injection molding, preferably the injection molding is carried out under the condition that the apparent melt viscosity of the thermoplastic liquid crystalline polyester resin or the composition thereof is 500 poise or less, measured at a shear rate of 1000 sec$^{-1}$ using a capillary viscometer (nozzle diameter: 1 mm, capillary length: 30 mm). Thus it is preferable to select and use the class of the thermoplastic liquid crystalline polyester resin or content of glass fiber in the composition thereof such that the resin or the composition satisfies the above melt viscosity condition at the melting temperature used during the injection molding process.

All thermoplastic liquid crystalline polyester resins having the above repeating unit (a), (b), (c) or (d) is particularly preferable, from the above viewpoint.

In this invention, the intermediate layer 5 of a thermoplastic liquid crystalline polyester resin can be easily formed by injecting the resin by an injection molding machine into the space between the outer pipe 3 and the inner pipe 4.

Although a typical injection molding machine can be used as the above injection molding machine, the machine does not need a mold and it is sufficient to furnish an injection molding machine with a proper pipe structure and inject a thermoplastic liquid crystalline polyester resin by the machine, from a gate through the pipe structure, into the space between the outer pipe 3 and inner pipe 4. In this case, the gap of the above space must be kept uniform, and one terminal of the above space sealed by a proper means.

The thermoplastic liquid crystalline polyester has relatively good vibration-damping properties. The vibration-damping properties of a high polymer are due to a distortion of the polymer by a deformation thereof applied from outside, which is transformed into a kinetic energy of a molecular chain.

Generally speaking, the above vibration-damping properties are closely related to the rigidity of a high polymer chain, and it is considered that the lower the rigidity, the more activated the movement of the molecular chain and the greater the vibration-damping property.

Nevertheless, the liquid crystalline polyester resin has a higher rigidity than usual high polymers, but still the vibration-damping properties are good. The reason for this is not clear, and an investigation thereof will be made in the future.

This invention exhibits the following effects:
(1) As the structure of the camshaft of this invention does not have a seam which needs welding, the problem of an accumulation of decomposition gas due to the decomposition of the high molecular resin, in the space between the outer pipe and the inner pipe, does not arise, and thus the maximum vibration-damping property of the intermediate resin layer is exhibited.

(2) Since a thermoplastic liquid crystalline polyester resin is used for the intermediate resin, and a reactive liquid is not used, the camshaft of this invention is most suitable for mass production.

Namely, according to this invention there is provided a camshaft for internal combustion engines, the camshaft having a light weight and excellent vibration-damping properties, and further, a structure by which the shaft is easily made, and thus is suitable for mass production. Such a shaft is particularly useful in the field of automobile manufacturing.

Hereinafter this invention will be illustrated by examples, to which it is in no way limited.

EXAMPLE 1

Figure 2:
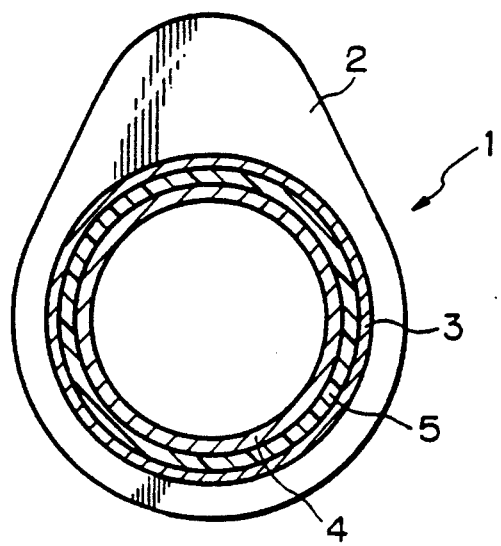
FIG. 2 is a cross-sectional view taken along the 2—2 line of FIG. 1.

A camshaft for inner combustion engines according to this invention, having a construction shown in FIGS. 1 and 2, was made by injecting a thermoplastic liquid crystalline polyester, using an injection molding machine, into a gap in a double pipe structure comprising an outer steel pipe and an inner aluminum pipe, to form an intermediate layer therebetween.

The manufacturing conditions were as follow:
(1) Measurements of the double-pipe structure:
   outer pipe: outer diameter 28 mm, inner diameter 22 mm
   inner pipe: outer diameter 16 mm, inner diameter 14 mm
   width of gap: 3 mm
   length of portion to be injected with resin: 283 mm
(2) Thermoplastic liquid crystalline polyester:
   70 parts by weight of Novaculate TM E322 manufactured by Mitsubishikasei Kabushiki Kaisha was combined with 30 parts by weight of glass short fibers, and kneaded to make a pellet.

The above resin is known as a typical liquid crystalline polyester resin partly containing copolymerized aliphatic groups.

The apparent melt viscosity of the pellet was measured at a shear rate of 1000 sec$^{-1}$ and an injection molding temperature of 300° C., using a capillary flow meter (CAPILLOGRAPH TM, manufactured by Toyoseiki Kabushiki Kaisha, nozzle diameter 1 mm, length 30 mm) and was found to be 320 poise.
(3) Injection molding machine
   A Mitsubishi Injection Molding Machine TM 350MG40 manufactured by Mitsubishijuko Kabushiki Kaisha (clamping force: 350 ton, injection capacity: 40 ounce).
(4) Injection molding condition
   resin temperature: 300° C.
   injection pressure: 1300 Kg/cm$^2$ The thermoplastic liquid crystalline polyester was injected uniformly and fully throughout the entire length of the resin injection portion.

The camshaft obtained was installed in a car engine, for experimentation, and the noise level (loudness of sound) measured during the running of the car engine.

The measurement of the noise level was carried out by placing a microphone 30 cm away from the camshaft, varying the number of rotations of the engine, and measuring the noise at 2.5 KHz.

The noise level of the camshaft of this invention, paticularly at a high speed engine rotation of 4000 rpm, was lower than that of an iron pipe camshaft (formed of a hollow pipe having an outer diameter of 28 mm and an inner diameter of 22 mm) by about 25%, and had substantially the same level as that a cast-iron camshaft (formed of a solid bar with an outer diameter of 28 mm). Further, the tone quality was substantially the same as that of a cast-iron camshaft.

Moreover, the camshaft described in the above Example 1 was 35% lighter in weight than a cast-iron camshaft of the same size.

We claim:
1. A camshaft for an internal combustion engine, said camshaft having a double-pipe shaft portion comprising an outer pipe, an inner pipe, and an intermediate layer therebetween, wherein said intermediate layer is composed of a material selected from the group consisting of thermoplastic liquid crystalline polyester resin and a composition of a thermoplastic liquid crystalline polyester resin that has been injected into a gap between said outer pipe and said inner pipe, wherein said resin is a polyester resin selected from the group consisting of polyesters having at least one segment represented by the formula —O—R—O—, —CO—R—CO—, —O—R—CO—, wherein R is a divalent selected from group represented by the following chemical formulae:

—CH$_2$—, —(CH$_2$)$_2$—, —(CH$_2$)$_4$—, —(CH$_2$)$_6$—,

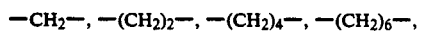

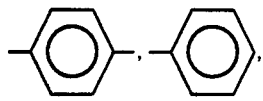

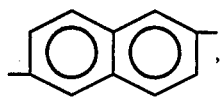

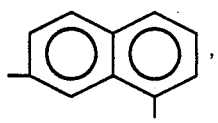

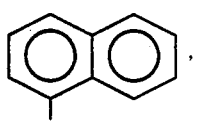

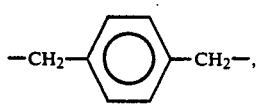

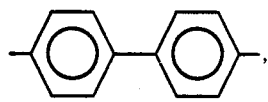

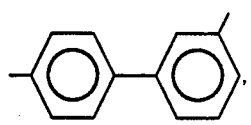

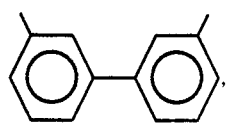

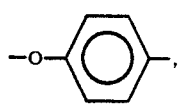

-continued

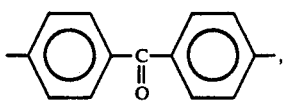

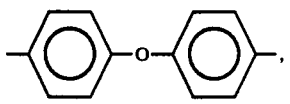

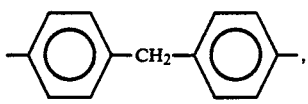

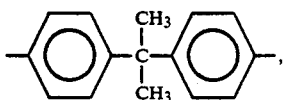

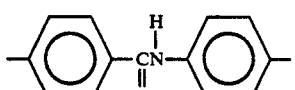

or

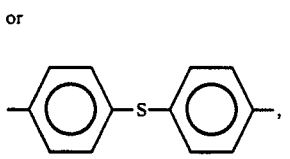

wherein one of an aromatic and an alicyclic group in the above formulae may have a substituent selected from group represented by the following chemical formulae:

—Br, —Cl, —COOH, —CONH$_2$,

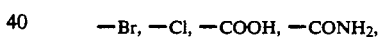

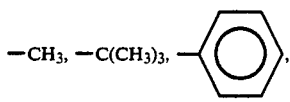

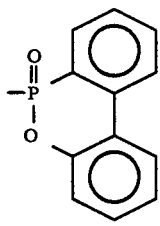

and

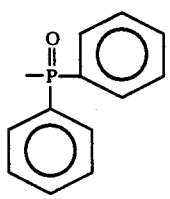

2. A camshaft for an internal combustion engine according to claim 1, wherein the apparent melt viscosity of said material is at most 500 poise, when measured at an injection temperature and a shear rate of 1000 sec$^{-1}$.

3. A camshaft for internal combustion engines according to claim 1, wherein said polyester resin has a repeating unit represented by any of the following chemical formulae (a), (b), (c) and (d):

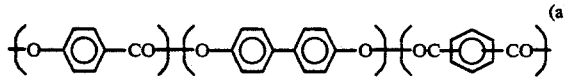
(a)

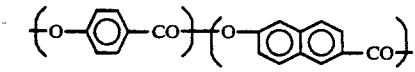
(b)

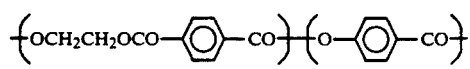
(c)

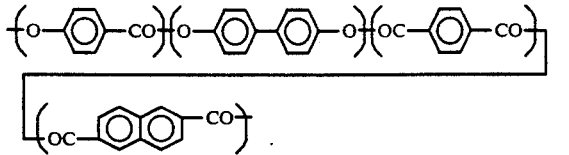
(d)

4. A camshaft for an internal combustion engine according to claim 1, wherein said intermediate layer further includes at least one substance selected from the group consisting of glass fibers, thermoplastic elastomers, plasticizers and fillers.

5. A camshaft for internal combustion engines according to claim 1, wherein said outer pipe is made of steel and said inner pipe is made of aluminum.

6. A camshaft for internal combustion engines according to claim 1, wherein the gap between the outer pipe and the inner pipe is 1 to 4 mm and a length of the camshaft is 250 mm or more.

* * * * *